US012579590B2

(12) United States Patent
Qian et al.

(10) Patent No.: US 12,579,590 B2
(45) Date of Patent: Mar. 17, 2026

(54) METHOD AND APPARATUS FOR RECIPE PREPARATION BASED ON INGREDIENT-RELATED DATA

(71) Applicant: Shenzhen Hione Smart Kitchen Appliances, Inc., Shenzhen (CN)

(72) Inventors: Tian Qian, Shenzhen (CN); Yi Qian, Shenzhen (CN)

(73) Assignee: Shenzhen Hione Smart Kitchen Appliances, Inc., Shenzhen (CN)

( * ) Notice: Subject to any disclaimer, the term of this patent is extended or adjusted under 35 U.S.C. 154(b) by 265 days.

(21) Appl. No.: 18/235,371

(22) Filed: Aug. 18, 2023

(65) Prior Publication Data

US 2024/0354876 A1    Oct. 24, 2024

(30) Foreign Application Priority Data

Apr. 21, 2023    (CN) .......................... 202310461890.5

(51) Int. Cl.
G06Q 50/12        (2012.01)
G06N 5/022        (2023.01)
(52) U.S. Cl.
CPC ............. G06Q 50/12 (2013.01); G06N 5/022 (2013.01)
(58) Field of Classification Search
CPC ......... G06Q 50/12; G06F 18/24; G06F 18/20; G06N 5/022; Y02P 90/30; G16H 20/60
See application file for complete search history.

(56) References Cited

U.S. PATENT DOCUMENTS

2009/0037288 A1* 2/2009 Christensen ............ G06F 16/00
                                                              708/133
2022/0179870 A1* 6/2022 Byron ................ G06Q 30/0631

* cited by examiner

*Primary Examiner* — Ariel J Yu
*Assistant Examiner* — Denisse Y Ortiz Roman

(57)        ABSTRACT

A method and an apparatus for recipe preparation based on ingredient-related data, the method includes: acquiring ingredient-related data of a target combination of ingredients uploaded by a user, the ingredient-related data comprising one or more of an ingredient type, a cooking process, a cooking cuisine, a finished cooking product and a cooking performance; analyzing a pending optimization situation corresponding to the target combination of ingredients according to the ingredient-related data; and generating a cooking recipe corresponding to the target combination of ingredients according to the pending optimization situation and the ingredient-related data. It is evident that the present application improves the comprehensiveness, flexibility and intelligence of the cooking recipe generation manner, which improves the reasonableness, dependability and optimizability of the generation of cooking recipes, which improves the accuracy and reliability of the generated cooking recipes, and which also improves the diversity and completeness of the generated cooking recipes.

16 Claims, 4 Drawing Sheets

Acquiring ingredient-related data of a target combination of ingredients uploaded by a user, the ingredient-related data comprising one or more of an ingredient type, a cooking process, a cooking cuisine, a finished cooking product and a cooking performance ⟋ 101

Analyzing a pending optimization situation corresponding to the target combination of ingredients according to the ingredient-related data ⟋ 102

Generating a cooking recipe corresponding to the target combination of ingredients according to the pending optimization situation and the ingredient-related data ⟋ 103

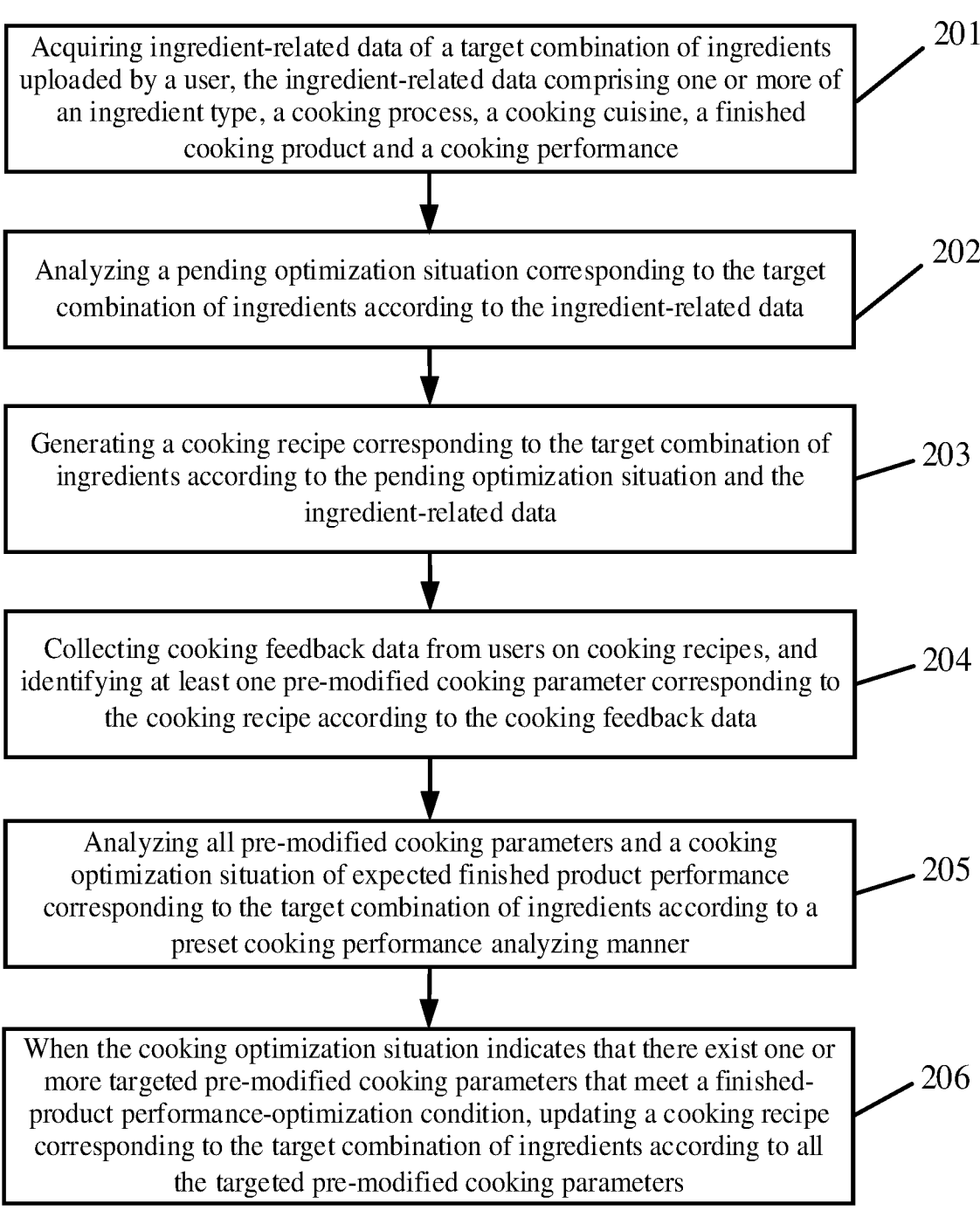

Acquiring ingredient-related data of a target combination of ingredients uploaded by a user, the ingredient-related data comprising one or more of an ingredient type, a cooking process, a cooking cuisine, a finished cooking product and a cooking performance — 201

Analyzing a pending optimization situation corresponding to the target combination of ingredients according to the ingredient-related data — 202

Generating a cooking recipe corresponding to the target combination of ingredients according to the pending optimization situation and the ingredient-related data — 203

Collecting cooking feedback data from users on cooking recipes, and identifying at least one pre-modified cooking parameter corresponding to the cooking recipe according to the cooking feedback data — 204

Analyzing all pre-modified cooking parameters and a cooking optimization situation of expected finished product performance corresponding to the target combination of ingredients according to a preset cooking performance analyzing manner — 205

When the cooking optimization situation indicates that there exist one or more targeted pre-modified cooking parameters that meet a finished-product performance-optimization condition, updating a cooking recipe corresponding to the target combination of ingredients according to all the targeted pre-modified cooking parameters — 206

Fig. 2

METHOD AND APPARATUS FOR RECIPE PREPARATION BASED ON INGREDIENT-RELATED DATA

CROSS REFERENCE TO RELATED APPLICATIONS

The present application claims the benefit of Chinese Patent Application No. 202310461890.5 filed on Apr. 21, 2023, the contents of which are incorporated herein by reference in their entirety.

FIELD OF THE INVENTION

The present application relates to the technical field of cooking, in particular to a method and an apparatus for recipe preparation based on ingredient-related data.

BACKGROUND OF THE INVENTION

With the improvement of people's living standards and the progress of science and technology, a variety of intelligent machines have emerged in order to facilitate the improvement of people's convenience of life and work efficiency. Among them, recipe-preparing equipment has appeared in the technical field of kitchen appliances. However, it is shown in practice that most of the existing recipe preparation methods synchronize the recipe preparation data input by the user directly to a preset template to generate recipes, in which the recipes prepared are of low accuracy and reliability. It is evident that it is important to provide a recipe preparation method that improves the accuracy and reliability of the prepared recipes.

SUMMARY OF THE INVENTION

The technical problem to be solved in the present application is to provide a method and an apparatus for recipe preparation based on ingredient-related data, which may improve the accuracy and reliability of the prepared recipe.

In order to solve the technical problems mentioned above, disclosed in a first aspect of the present application is a method for recipe preparation based on ingredient-related data, the method includes:

acquiring ingredient-related data of a target combination of ingredients uploaded by a user, the ingredient-related data including one or more of an ingredient type, a cooking process, a cooking cuisine, a finished cooking product and a cooking performance;

analyzing a pending optimization situation corresponding to the target combination of ingredients according to the ingredient-related data; and generating a cooking recipe corresponding to the target combination of ingredients according to the pending optimization situation and the ingredient-related data.

As an optional embodiment, in the first aspect of the present application, analyzing a pending optimization situation corresponding to the target combination of ingredients according to the ingredient-related data includes:

analyzing at least one targeted pending optimization type corresponding to the target combination of ingredients according to the ingredient-related data and a preset pending-optimization-type analyzing manner; and identifying the pending optimization situation corresponding to the target combination of ingredients according to all the targeted pending optimization types and the ingredient-related data.

As an optional embodiment, in the first aspect of the present application, identifying the pending optimization situation corresponding to the target combination of ingredients according to all the targeted pending optimization types and the ingredient-related data includes:

identifying a pending optimization orientation corresponding to each targeted pending optimization type according to a preset optimization-orientation analyzing manner, and determining whether there exist at least two pending-optimization conflicting types meeting an optimization conflicting condition in all targeted pending optimization types according to all pending optimization orientations;

when a corresponding determination result is positive, selecting the pending-optimization conflicting type from all targeted pending optimization types, and identifying an expected finished product performance corresponding to the target combination of ingredients;

analyzing an optimization type adjusting situation according to the expected finished product performance and all pending-optimization conflicting types; the optimization type adjusting situation is used for adjusting the targeted pending optimization type, so that all targeted pending optimization types do not satisfy the optimization conflicting condition;

identifying at least one final pending optimization type according to the optimization type adjusting situation and all targeted pending optimization types; identifying the pending optimization situation corresponding to the target combination of ingredients according to all final pending optimization types and the ingredient-related data; and when a corresponding determination result is negative, identifying the pending optimization situation of the target combination of ingredients according to all targeted pending optimization types and the ingredient-related data.

As an optional embodiment, in the first aspect of the present application, analyzing at least one targeted pending optimization type corresponding to the target combination of ingredients according to the ingredient-related data and a preset pending-optimization-type analyzing manner includes:

identifying the expected finished product performance corresponding to the target combination of ingredients, and identifying a predicted finished product performance corresponding to the ingredient-related data according to the ingredient-related data and a preset finished-product-effect analyzing manner;

determining whether the expected finished product performance matches the predicted finished product performance; and when a corresponding determination result is negative, identifying difference information corresponding to the expected finished product performance and the predicted finished product performance, and identifying at least one targeted pending optimization type corresponding to the target combination of ingredients according to the difference information and the ingredient-related data.

As an optional embodiment, in the first aspect of the present application, before identifying at least one targeted pending optimization type corresponding to the target combination of ingredients according to the difference information and the ingredient-related data, the method also includes:

analyzing, according to the difference information, execution possibility to achieve the expected finished product performance based on the target combination of ingredients;

determining whether the execution possibility is greater than or equal to a preset execution possibility threshold; and when a corresponding determination result is positive, performing an operation of identifying at least one targeted pending optimization type corresponding to the target combination of ingredients according to the difference information and the ingredient-related data.

As an optional embodiment, in the first aspect of the present application, identifying at least one targeted pending optimization type corresponding to the target combination of ingredients according to the difference information and the ingredient-related data includes:

computing a similarity degree between a matching finished product performance corresponding to each historical cooking recipe and the expected finished product performance according to the expected finished product performance corresponding to the target combination of ingredients, and selecting at least one targeted historical cooking recipe with the similarity degree that meets similarity filter conditions in all historical cooking recipes;

analyzing special-handling-operation information to achieve the expected finished product performance based on the target combination of ingredients, according to matching ingredient-related data corresponding to selected targeted historical cooking recipes, the ingredient-related data and the difference information; and identifying at least one targeted pending optimization type corresponding to the target combination of ingredients according to the special-handling-operation information.

As an optional embodiment, in the first aspect of the present application, after generating a cooking recipe corresponding to the target combination of ingredients according to the pending optimization situation and the ingredient-related data, the method also includes:

collecting cooking feedback data from users on cooking recipes, and identifying at least one pre-modified cooking parameter corresponding to the cooking recipe according to the cooking feedback data;

analyzing all pre-modified cooking parameters and a cooking optimization situation of expected finished product performance corresponding to the target combination of ingredients according to a preset cooking performance analyzing manner; and when the cooking optimization situation is used for indicating that there exists one or more targeted pre-modified cooking parameter satisfying a finished-product performance-optimization condition, updating a cooking recipe corresponding to the target combination of ingredients according to all the targeted pre-modified cooking parameters.

Disclosed in a second aspect of the present application is an apparatus for recipe preparation based on ingredient-related data, the apparatus includes:

an information-acquiring module, used for acquiring ingredient-related data of a target combination of ingredients uploaded by a user, the ingredient-related data including one or more of an ingredient type, a cooking process, a cooking cuisine, a finished cooking product and a cooking performance;

an analyzing module, used for analyzing a pending optimization situation corresponding to the target combination of ingredients according to the ingredient-related data; and a recipe-generating module, used for generating a cooking recipe corresponding to the target combination of ingredients according to the pending optimization situation and the ingredient-related data.

As an optional embodiment, in the second aspect of the present application, the step of the analyzing module analyzing a pending optimization situation corresponding to the target combination of ingredients according to the ingredient-related data specifically includes:

analyzing at least one targeted pending optimization type corresponding to the target combination of ingredients according to the ingredient-related data and a preset pending-optimization-type analyzing manner; and identifying the pending optimization situation corresponding to the target combination of ingredients according to all the targeted pending optimization types and the ingredient-related data.

As an optional embodiment, in the second aspect of the present application, the step of the analyzing module identifying the pending optimization situation corresponding to the target combination of ingredients according to all the targeted pending optimization types and the ingredient-related data specifically includes:

identifying a pending optimization orientation corresponding to each targeted pending optimization type according to a preset optimization-orientation analyzing manner, and determining whether there exist at least two pending-optimization conflicting types meeting an optimization conflicting condition in all targeted pending optimization types according to all pending optimization orientations;

when a corresponding determination result is positive, selecting the pending-optimization conflicting type from all targeted pending optimization types, and identifying an expected finished product performance corresponding to the target combination of ingredients; analyzing an optimization type adjusting situation according to the expected finished product performance and all pending-optimization conflicting types; the optimization type adjusting situation is used for adjusting the targeted pending optimization type, so that all targeted pending optimization types do not satisfy the optimization conflicting condition;

identifying at least one final pending optimization type according to the optimization type adjusting situation and all targeted pending optimization types; identifying the pending optimization situation corresponding to the target combination of ingredients according to all final pending optimization types and the ingredient-related data; and when a corresponding determination result is negative, identifying the pending optimization situation of the target combination of ingredients according to all targeted pending optimization types and the ingredient-related data.

As an optional embodiment, in the second aspect of the present application, the step of the analyzing module analyzing at least one targeted pending optimization type corresponding to the target combination of ingredients according to the ingredient-related data and a preset pending-optimization-type analyzing manner specifically includes:

identifying the expected finished product performance corresponding to the target combination of ingredients, and identifying a predicted finished product performance corresponding to the ingredient-related data according to the ingredient-related data and a preset finished-product-effect analyzing manner;

determining whether the expected finished product performance matches the predicted finished product performance; and when a corresponding determination result is negative, identifying difference information corresponding to the expected finished product performance and the predicted finished product performance, and identifying at least one targeted pending optimization type corresponding to the target combination of ingredients according to the difference information and the ingredient-related data.

As an optional embodiment, in the second aspect of the present application, the analyzing module is also used for, before identifying at least one targeted pending optimization type corresponding to the target combination of ingredients according to the difference information and the ingredient-related data, analyzing, according to the difference information, execution possibility to achieve the expected finished product performance based on the target combination of ingredients; determining whether the execution possibility is greater than or equal to a preset execution possibility threshold; and when a corresponding determination result is positive, performing an operation of identifying at least one targeted pending optimization type corresponding to the target combination of ingredients according to the difference information and the ingredient-related data.

As an optional embodiment, in the second aspect of the present application, the step of the analyzing module identifying at least one targeted pending optimization type corresponding to the target combination of ingredients according to the difference information and the ingredient-related data specifically includes:

computing a similarity degree between a matching finished product performance corresponding to each historical cooking recipe and the expected finished product performance according to the expected finished product performance corresponding to the target combination of ingredients, and selecting at least one targeted historical cooking recipe with the similarity degree that meets similarity filter conditions in all historical cooking recipes;

analyzing special-handling-operation information to achieve the expected finished product performance based on the target combination of ingredients, according to matching ingredient-related data corresponding to selected targeted historical cooking recipes, the ingredient-related data and the difference information; and identifying at least one targeted pending optimization type corresponding to the target combination of ingredients according to the special-handling-operation information.

As an optional embodiment, in the second aspect of the present application, the information acquiring module is also used for, after generating a cooking recipe corresponding to the target combination of ingredients according to the pending optimization situation and the ingredient-related data, collecting cooking feedback data from users on cooking recipes;

the analyzing module is also used for identifying at least one pre-modified cooking parameter corresponding to the cooking recipe according to the cooking feedback data; analyzing all pre-modified cooking parameters and a cooking optimization situation of expected finished product performance corresponding to the target combination of ingredients according to a preset cooking performance analyzing manner; and the apparatus also includes:

a recipe-updating module, used for, when the cooking optimization situation is used for indicating that there exists one or more targeted pre-modified cooking parameter satisfying a finished-product performance-optimization condition, updating a cooking recipe corresponding to the target combination of ingredients according to all the targeted pre-modified cooking parameters.

Disclosed in a third aspect of the present application is an apparatus for recipe preparation based on ingredient-related data, the apparatus includes:

a memory, memorized with an executable code; and a processor, coupled with the memory, wherein the processor invokes the executable code memorized in the memory to perform the method for recipe preparation based on ingredient-related data disclosed in the first aspect of the present application.

Disclosed as a fourth aspect in the present application is a computer memory medium, and the computer memory medium memorizes computer instructions; when the computer instructions are invoked, the method for recipe preparation based on ingredient-related data disclosed in the first aspect of the present application is performed.

Compared to the prior art, the embodiments of the present application have beneficial effects as follows.

In the embodiments of the present application: acquiring ingredient-related data of a target combination of ingredients uploaded by a user, the ingredient-related data including one or more of an ingredient type, a cooking process, a cooking cuisine, a finished cooking product and a cooking performance; analyzing a pending optimization situation corresponding to the target combination of ingredients according to the ingredient-related data; and generating a cooking recipe corresponding to the target combination of ingredients according to the pending optimization situation and the ingredient-related data. It is evident that the present application may perform the optimizing analysis of the target combination of ingredients and the ingredient-related data, and generate the cooking recipe corresponding to the target combination of ingredients based on the identified pending optimization situation, which is beneficial to improve the comprehensiveness, flexibility and intelligence of the cooking recipe generation manner, which is beneficial to improve the reasonableness, dependability and optimizability of the generation of cooking recipes, which is beneficial to improve the accuracy and reliability of the generated cooking recipes, and which is also beneficial to improve the diversity and completeness of the generated cooking recipes.

BRIEF DESCRIPTION OF THE DRAWINGS

In order to illustrate the technical solutions of the embodiments of the present application more clearly, the following drawings are briefly described as required in the context of the embodiments. Obviously, the following drawings only illustrate some of the embodiments of the present application. Other relevant drawings may be obtained on the basis of these drawings without any creative effort by those skilled in the art.

FIG. 2 is a flow diagram of another method for recipe preparation based on ingredient-related data disclosed in an embodiment of the present application;

DETAILED DESCRIPTION OF THE PREFERRED EMBODIMENTS

For a better understanding of the solutions of the present application by those skilled in the art, the technical solutions in the embodiments of the present application are clearly and completely described and discussed below in conjunction with the attached drawings of the present embodiments of the application. Obviously, the embodiments described herein are only some of the embodiments of the present application but not all of them. Based on the embodiments in the present application, all other embodiments acquired by those skilled in the art without inventive effort fall within the scope of protection of the present application.

The terms "first", "second", and the like in the specification, the claims and the above-mentioned drawings of the present application are used to identify different objects and are not intended to describe a particular sequence. In addition, the terms "comprise" and "include", and any derivatives and conjugations thereof, are intended to cover non-exclusive inclusion. For example, a process, method, apparatus, product, or device that comprises a series of steps or units is not limited to the listed steps or units, but optionally also comprises steps or units that are not listed, or optionally also comprises other steps or units that are inherent to those processes, methods, products, or devices.

The term "embodiment" herein means that a particular feature, structure or characteristic described in conjunction with an embodiment may be included in at least one embodiment of the present application. The presence of the term in various places in the specification does not necessarily indicate the same embodiment, nor is it a separate or alternative embodiment that is mutually exclusive with other embodiments. It is understood, both explicitly and implicitly, by those skilled in the art that the embodiments described herein may be combined with other embodiments.

Disclosed in the present application is a method and an apparatus for recipe preparation based on ingredient-related data. The method and the apparatus may perform the optimizing analysis of the target combination of ingredients and the ingredient-related data, and generate the cooking recipe corresponding to the target combination of ingredients based on the identified pending optimization situation, which is beneficial to improve the comprehensiveness, flexibility and intelligence of the cooking recipe generation manner, which is beneficial to improve the reasonableness, dependability and optimizability of the generation of cooking recipes, which is beneficial to improve the accuracy and reliability of the generated cooking recipes, and which is also beneficial to improve the diversity and completeness of the generated cooking recipes. Detailed descriptions are provided respectively as follows.

Embodiment 1

Figure 1:
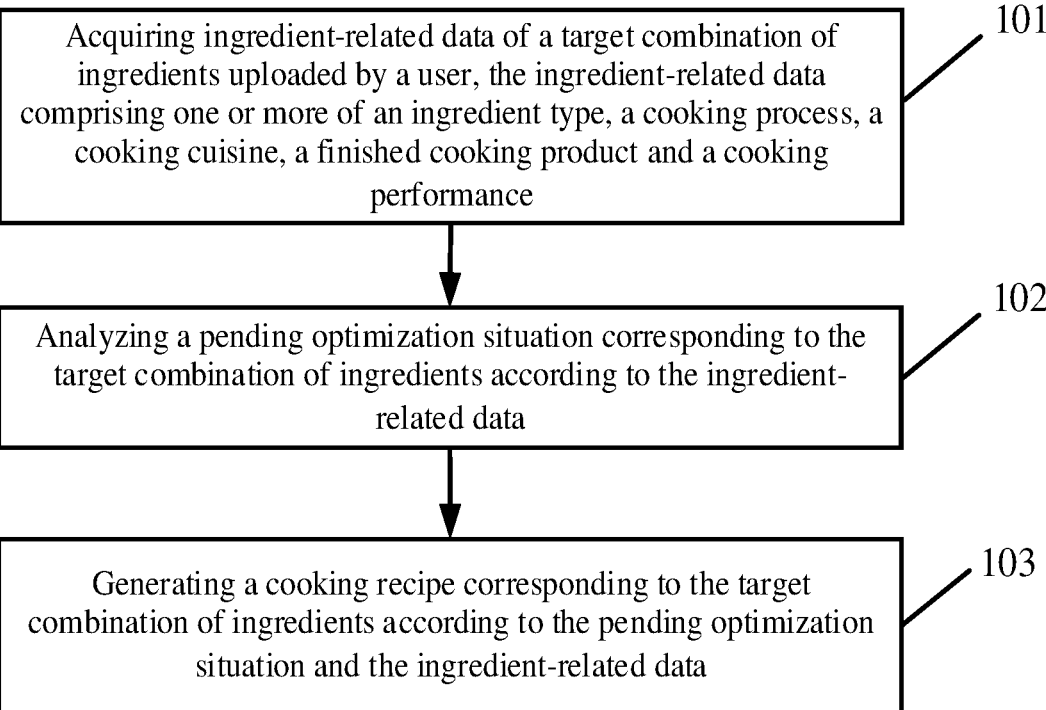
FIG. 1 is a flow diagram of a method for recipe preparation based on ingredient-related data disclosed in an embodiment of the present application.

Referring to FIG. 1, FIG. 1 is a flow diagram of a method for recipe preparation based on ingredient-related data disclosed in the present embodiment of the application. The method described in FIG. 1 may be applied to an apparatus for recipe preparation based on ingredient-related data, and the apparatus may include a server, wherein the server includes a local server or a cloud server, which is not limited in the present embodiment of the application. As shown in FIG. 1, the method for recipe preparation based on ingredient-related data includes steps as follows:

At step 101, acquiring ingredient-related data of a target combination of ingredients uploaded by a user, the ingredient-related data including one or more of an ingredient type, a cooking process, a cooking cuisine, a finished cooking product and a cooking performance.

Optionally, the ingredient type included in the ingredient-related data may be food information of a generalized type such as vegetarian ingredients, meat ingredients, chilling ingredients and warming ingredients, or it may be specific to the actual food information such as pork, chicken, fish and baby Chinese cabbage, which is not limited in the present embodiment of the application.

Optionally, the cooking process included in the ingredient-related data may be a cooking process that the user has performed in real life for the target combination of ingredients or an unperformed cooking process that the user associates with the target combination of ingredients. The cooking process included in the ingredient-related data may be an expected cooking process or a predicted cooking process. The cooking process included in the ingredient-related data may be process step information specific to each operation detail or generalized process step information, which is not limited in the present embodiment of the application.

Optionally, the cooking operation corresponding to the target combination of ingredients may include one or more cooking processes. Further, each cooking process may include one or more cooking steps, which is not limited in the present embodiment of the application.

Optionally, the cooking cuisine included in the ingredient-related data may be an expected cooking cuisine or a predicted cooking cuisine. Further, and the cooking cuisines are exemplified as Shandong style, Sichuan style, Cantonese style, Jiangsu style, Zhejiang style, Fujian style, Hunan style, Anhui style, western style and other styles, which is not limited in the present embodiment of the application.

Optionally, the finished cooking product included in the ingredient-related data may be an actual finished cooking product that the user has performed in real life for the target combination of ingredients or an unperformed expected finished cooking product that the user associates with the target combination of ingredients. The finished cooking product included in the ingredient-related data may be an expected finished cooking product or a predicted finished cooking product. The finished cooking product included in the ingredient-related data may be a finished cooking product with one or more of tasting flavors, color, texture, aroma, temperature, appearance and other information associated with the finished cooking product, which is not limited in the present embodiment of the application.

Optionally, the cooking performance included in the ingredient-related data may be an actual cooking performance that the user has performed in real life for the target combination of ingredients or an unperformed expected cooking performance that the user associates with the target combination of ingredients. The cooking performance included in the ingredient-related data may be an expected cooking performance or a predicted cooking performance. The cooking performance included in the ingredient-related data may be any cooking information that embodies the finished cooking product, cooking process, cooking requirement, cooking result and cooking purpose, which is not limited in the present embodiment of the application.

At step 102, analyzing a pending optimization situation corresponding to the target combination of ingredients according to the ingredient-related data.

Optionally, the pending optimization situation corresponding to the target combination of ingredients may be a cooking improving adjusting situation corresponding to the target combination of ingredients, an incorrect cooking situation corresponding to the target combination of ingredients, or an achievable cooking situation corresponding to the target combination of ingredients, which is not limited in the present embodiment of the application.

At step 103, generating a cooking recipe corresponding to the target combination of ingredients according to the pending optimization situation and the ingredient-related data.

Optionally, generating the cooking recipe corresponding to the target combination of ingredients may directly generate a cooking recipe according to the ingredient-related data when the pending optimization situation indicates that there is no need for optimization, or generate a cooking recipe after adjusting by optimizing analysis according to the ingredient-related data and the pending optimization situation, which is not limited in the present embodiment of the application.

It is evident that performing the method for recipe preparation based on ingredient-related data described in the present embodiment of the application may perform the optimizing analysis of the target combination of ingredients and the ingredient-related data, and generate the cooking recipe corresponding to the target combination of ingredients based on the identified pending optimization situation, which is beneficial to improve the comprehensiveness, flexibility and intelligence of the cooking recipe generation manner, which is beneficial to improve the reasonableness, dependability and optimizability of the generation of cooking recipes, which is beneficial to improve the accuracy and reliability of the generated cooking recipes, and which is also beneficial to improve the diversity and completeness of the generated cooking recipes.

In an optional embodiment, the aforementioned step of analyzing a pending optimization situation corresponding to the target combination of ingredients according to the ingredient-related data may include:

analyzing at least one targeted pending optimization type corresponding to the target combination of ingredients according to the ingredient-related data and a preset pending-optimization-type analyzing manner; and identifying the pending optimization situation corresponding to the target combination of ingredients according to all the targeted pending optimization types and the ingredient-related data.

Optionally, the pending-optimization-type analyzing manner may include, but be not limited to, one or more of a cooking color-aroma-taste optimization-type analyzing manner, a cooking process optimization-type analyzing manner, a cooking requirement optimization-type analyzing manner, a cooking time optimization-type analyzing manner, a cooking seasoning optimization-type analyzing manner, a cooking heat optimization-type analyzing manner and any other optimization-type analyzing manners used for generating information of cooking recipe, which is not limited in the present embodiment of the application.

Optionally, the targeted pending optimization type may include, but be not limited to, one or more of a color-aroma-taste optimization type, a cooking process optimization type, a cooking requirement optimization type, a cooking time optimization type, a cooking seasoning optimization type, a cooking heat optimization type and any other optimization types with cooking related information. Further, the targeted pending optimization type may also be specific to a type with specific optimizing content, such as an improvement of aroma optimization type and an improvement of sweetness optimization type, which is not limited in the present embodiment of the application.

It is evident that, in the present optional embodiment, different pending optimization types may be identified, and the pending optimization situation may be identified according to one or more identified pending optimization types, which is beneficial to improve the comprehensiveness and reasonableness of the identified manner of the pending optimization situation, which is beneficial to improve the diversity and comprehensiveness of the pending optimization type, which is also beneficial to improve the accuracy and reliability of the identified pending optimization situation.

In an optional embodiment, the aforementioned step of identifying the pending optimization situation corresponding to the target combination of ingredients according to all the targeted pending optimization types and the ingredient-related data may include:

identifying a pending optimization orientation corresponding to each targeted pending optimization type according to a preset optimization-orientation analyzing manner, and determining whether there exist at least two pending-optimization conflicting types meeting an optimization conflicting condition in all targeted pending optimization types according to all pending optimization orientations;

when a corresponding determination result is positive, selecting the pending-optimization conflicting type from all targeted pending optimization types, and identifying an expected finished product performance corresponding to the target combination of ingredients; analyzing an optimization type adjusting situation according to the expected finished product performance and all pending-optimization conflicting types; the optimization type adjusting situation is used for adjusting the targeted pending optimization type, so that all targeted pending optimization types do not satisfy the optimization conflicting condition;

identifying at least one final pending optimization type according to the optimization type adjusting situation and all targeted pending optimization types; identifying the pending optimization situation corresponding to the target combination of ingredients according to all final pending optimization types and the ingredient-related data; and when a corresponding determination result is negative, identifying the pending optimization situation of the target combination of ingredients according to all targeted pending optimization types and the ingredient-related data.

Optionally, the targeted pending optimization type and the pending optimization orientation are exemplified as follows. When the targeted pending optimization type is a color-aroma-taste optimization type, the corresponding pending optimization orientation may be such as increasing salinity and decreasing salinity. When the targeted pending optimization type is a cooking time optimization type, the corresponding pending optimization orientation may be such as extending cooking time and reducing cooking time. The relationship between the other targeted pending optimization types and the corresponding pending optimization orientations may be obtained in the same way, which is not repeated hereby. Further, for example, when the targeted pending optimization type is specific to a type with specific optimizing content, such as the improvement of sweetness optimization type, then the pending optimization orientation is improvement of sweetness orientation. The relationship between the other targeted pending optimization types and the corresponding pending optimization orientations may be obtained in the same way, which is not repeated hereby.

Optionally, the pending-optimization conflicting type may be understood that the cooking significance corresponding to at least two pending optimization orientations is mismatched, such as opposite cooking effectiveness and low cooking relevance. For example, when the pending optimization orientation of a first pending optimization type is to increase saltiness and the pending optimization orientation of a second pending optimization type is to decrease saltiness, then the first pending optimization type and the second pending optimization type meet the optimization conflicting condition, and the first pending optimization type and the second pending optimization type are identified as the pending-optimization conflicting type. Also, when the pending optimization orientation of a first pending optimization type is to extend the cooking time and the pending optimization orientation of a second pending optimization type is to enhance the hardness of the texture of the finished product, then the first pending optimization type and the second pending optimization type meet the optimization conflicting condition, and the first pending optimization type and the second pending optimization type are identified as the pending-optimization conflicting type. The identified manner of the other pending-optimization conflicting types may be obtained in the same way, which is not repeated hereby.

Optionally, the aforementioned step of identifying at least one final pending optimization type according to the optimization type adjusting situation and all targeted pending optimization types may select at least one targeted pending optimization type from all targeted pending optimization types as the final pending optimization type according to the optimization type adjusting situation, or may analyze a new pending optimization type as the final pending optimization type according to the optimization type adjusting situation and all targeted pending optimization types, which is not limited in the present embodiment of the application.

It is evident that, in the present optional embodiment, the pending optimization conflicting situation may be identified according to the pending optimization orientation corresponding to each pending optimization type, and an identified manner corresponding to the pending optimization situation may be identified according to the pending optimization conflicting situation, which is beneficial to improve the comprehensiveness and reasonableness of the identified manner of the pending optimization situation, which is beneficial to improve the flexibility and relevance of the identified manner of the pending optimization situation, which is also beneficial to improve the accuracy and reliability of the identified pending optimization situation.

In an optional embodiment, the aforementioned step of analyzing at least one targeted pending optimization type corresponding to the target combination of ingredients according to the ingredient-related data and a preset pending-optimization-type analyzing manner may include:

identifying the expected finished product performance corresponding to the target combination of ingredients, and identifying a predicted finished product performance corresponding to the ingredient-related data according to the ingredient-related data and a preset finished-product-effect analyzing manner;

determining whether the expected finished product performance matches the predicted finished product performance; and when a corresponding determination result is negative, identifying difference information corresponding to the expected finished product performance and the predicted finished product performance, and identifying at least one targeted pending optimization type corresponding to the target combination of ingredients according to the difference information and the ingredient-related data.

Optionally, the expected finished product performance corresponding to the target combination of ingredients may be understood as the finished product performance which is expected to be achieved by referring to a recipe corresponding to the target combination of ingredients, or may be understood as the finished product performance which is expected to be achieved after cooking optimization corresponding to the target combination of ingredients, which is not limited in the present embodiment of the application.

Optionally, the predicted finished product performance corresponding to the target combination of ingredients may be understood as the finished product performance which is predicted and analyzed to be achieved based on the target combination of ingredients and the cooking recipe, or may be understood as the finished product performance which is predicted and analyzed to be achieved based on the history finished cooking product performance and the target combination of ingredients, which is not limited in the present embodiment of the application.

Further and optionally, when the expected finished product performance is identified to match the predicted finished product performance, identified the targeted pending optimization type corresponding to the target combination of ingredients, and the targeted pending optimization type is indicated to be empty (i.e., no need to optimize), which is not limited in the present embodiment of the application.

Optionally, the corresponding difference information between the expected finished product performance and the predicted finished product performance may be the direct difference information between the expected finished product performance and the predicted finished product performance, or may be the corresponding specific difference information between the expected finished product performance and the predicted finished product performance (such as the difference during cooking and/or difference of finished product. Further, such as the difference in the cooking process, color-aroma-taste during cooking, color-aroma-taste of the finished product, temperature during cooking, temperature of finished product, softness and hardness of the finished product, and cooking heat duration), which is not limited in the present embodiment of the application.

It is evident that, in the present optional embodiment, the difference information between the expected finished product performance and the predicted finished product performance may be identified, and the targeted pending optimization type may be identified based on the difference information, which is beneficial to improve the comprehensiveness and reasonableness of the identified manner of the pending optimization type, which is beneficial to the accuracy and reliability of the identified pending optimization type. Additionally, when the expected finished product performance and the predicted finished product performance mismatch, performing the identification of the targeted pending optimization type based on the difference information, which is beneficial to improve the relevance and matching of the identified manner of the pending optimization type, which is beneficial to improve the identified efficiency and accuracy of the pending optimization type.

In an optional embodiment, aforementioned step of before identifying at least one targeted pending optimization type corresponding to the target combination of ingredients according to the difference information and the ingredient-related data, the method may also include operations as follows:

analyzing, according to the difference information, execution possibility to achieve the expected finished product performance based on the target combination of ingredients;
    determining whether the execution possibility is greater than or equal to a preset execution possibility threshold; and
    when a corresponding determination result is positive, performing the aforementioned operation of identifying at least one targeted pending optimization type corresponding to the target combination of ingredients according to the difference information and the ingredient-related data.

Optionally, execution possibility to achieve the expected finished product performance based on the target combination of ingredients may be understood as the possibility that the compatibility between the predicted finished performance cooked by the cooking information after adjusting based on the difference information and the expected finished performance is greater than or equal to a preset compatibility threshold, or may be understood as the possibility of the expected finished product performance cooked by overcoming the difference information based on the target combination of ingredients, which is not limited in the present embodiment of the application.

Further and optionally, a prompt instruction is generated when it is determined that the execution possibility is smaller than the execution possibility threshold, wherein the prompt instruction is used for indicating the user that it is unable to intelligently generate cooking recipes that match the expected finished product performance and/or record new ingredient-related data. Alternatively, when it is determined that the execution possibility is smaller than the execution possibility threshold, a reference history cooking data with the highest similarity to the expected finished product performance is identified according to the difference information and the history cooking data, and at least one targeted pending optimization type corresponding to the target combination of ingredients is identified according to the reference history cooking data, which is not limited in the present embodiment of the application.

It is evident that, in the present optional embodiment, the step of identifying the targeted pending optimization type based on the difference information is only performed when the execution possibility is greater than or equal to the execution possibility threshold, which is beneficial to improve the comprehensiveness and reasonableness of the identified manner of the pending optimization type, which is beneficial to improve the reasonableness and feasibility of the identified pending optimization type, which also reduces unnecessary waste of resources.

In an optional embodiment, the aforementioned step of identifying at least one targeted pending optimization type corresponding to the target combination of ingredients according to the difference information and the ingredient-related data may include:

computing a similarity degree between a matching finished product performance corresponding to each historical cooking recipe and the expected finished product performance according to the expected finished product performance corresponding to the target combination of ingredients, and selecting at least one targeted historical cooking recipe with the similarity degree that meets similarity filter conditions in all historical cooking recipes;
    analyzing special-handling-operation information to achieve the expected finished product performance based on the target combination of ingredients, according to matching ingredient-related data corresponding to selected targeted historical cooking recipes, the ingredient-related data and the difference information; and
    identifying at least one targeted pending optimization type corresponding to the target combination of ingredients according to the special-handling-operation information.

Optionally, the matching finished product performance corresponding to the historical cooking recipe may be understood as a finished product performance that is cooked based on the historical cooking recipe, or may be understood as a matching finished product performance that is predicted based on the historical cooking recipe, which is not limited in the present embodiment of the application.

Optionally, the aforementioned similarity degree that meets similarity filter conditions may be that the similarity degree is greater than or equal to a preset similarity degree threshold, or may be a similarity degree ranking meets a ranking condition (for example, top three of the ranking meet the ranking condition), which is not limited in the present embodiment of the application.

It is evident that the special-handling-operation information may be understood as handling-operation information that enables the target ingredient to achieve the expected finished product performance after certain handling operations, which is not limited in the present embodiment of the application.

It is evident that, in the present optional embodiment, the special-handling-operation information may be analyzed in conjunction with the historical cooking recipes, and the targeted pending optimization type may be identified according to the special-handling-operation information, which is beneficial to improve the comprehensiveness and comparability of the identified manner of the pending optimization type, which is beneficial to improve the reasonableness of the identified manner of the pending optimization type, which is also beneficial to improve the accuracy and reliability of the identified pending optimization type.

Embodiment 2

Referring to FIG. 2, FIG. 2 is a flow diagram of another method for recipe preparation based on ingredient-related data disclosed in the present embodiment of the application. The method described in FIG. 2 may be applied to an apparatus for recipe preparation based on ingredient-related data, and the apparatus may include a server, wherein the server includes a local server or a cloud server, which is not limited in the present embodiment of the application. As shown in FIG. 2, the method for recipe preparation based on ingredient-related data includes steps as follows:

At step 201, acquiring ingredient-related data of a target combination of ingredients uploaded by a user, the ingredient-related data including one or more of an ingredient type, a cooking process, a cooking cuisine, a finished cooking product and a cooking performance.

At step 202, analyzing a pending optimization situation corresponding to the target combination of ingredients according to the ingredient-related data.

At step 203, generating a cooking recipe corresponding to the target combination of ingredients according to the pending optimization situation and the ingredient-related data.

At step 204, collecting cooking feedback data from users on cooking recipes, and identifying at least one pre-modified cooking parameter corresponding to the cooking recipe according to the cooking feedback data.

Optionally, the cooking feedback data of the cooking recipe from users may be information on dissatisfaction/complaints provided by users on cooking recipes, or may be information on the desire for optimization and adjustment provided from users on cooking recipes, or may be information on a desire for achieving cooking requirements provided from users on cooking recipes, or may be other feedback evaluation information that is able to be used for adjusting cooking recipes provided from users on cooking recipes, which is not limited in the present embodiment of the application.

Optionally, the pre-modified cooking parameter may include, but be not limited to, specific pre-modified cooking detail and/or pre-modified cooking type. The pre-modified cooking type may be one or more parameters of pre-modified cooking color-aroma-taste, pre-modified cooking process, pre-modified cooking requirement, pre-modified cooking time, pre-modified cooking seasoning, pre-modified cooking heat and other pre-modified cooking information, which is not limited in the present embodiment of the application. Further, the pre-modified cooking detail is exemplified as modifying the cooking time from 10 seconds to 5 seconds and modifying the cooking heat from high to low, which is not repeated hereby.

At step 205, analyzing all pre-modified cooking parameters and a cooking optimization situation of expected finished product performance corresponding to the target combination of ingredients according to a preset cooking performance analyzing manner.

Optionally, analyzing all pre-modified cooking parameters and a cooking optimization situation of expected finished product performance corresponding to the target combination of ingredients may be understood as: after updating the cooking recipe based on the pre-modified cooking parameters, analyzing whether the predicted finished product performance of the updated cooking recipe is more compatible with the expected finished product performance corresponding to the target combination of ingredients. Further, it is used for identifying whether there exists at least one target pre-modified cooking parameter among all the pre-modified cooking parameters that is useful for achieving a better match between the predicted finished product performance and the expected finished product performance corresponding to the target combination of ingredients, which is not limited in the present embodiment of the application.

At step 206, when the cooking optimization situation is used for indicating that there exist one or more targeted pre-modified cooking parameters that meet a finished-product performance-optimization condition, updating a cooking recipe corresponding to the target combination of ingredients according to all the targeted pre-modified cooking parameters.

Optionally, satisfying a finished-product performance-optimization condition may be understood that the predicted finished product performance of the updated cooking recipe based on the target pre-modified cooking parameters is closer to the expected finished product performance corresponding to the target combination of ingredients than the predicted finished product performance of the non-updated cooking recipe, which is not limited in the present embodiment of the application.

Optionally, aforementioned updating a cooking recipe corresponding to the target combination of ingredients according to all the targeted pre-modified cooking parameters may be generating a new recipe based on all the target pre-modified cooking parameters, and replacing the recipe corresponding to the target combination of ingredients with the new recipe, or may be directly changing the content of the cooking recipes corresponding to the target combination of ingredients to update the cooking recipes corresponding to the target combination of ingredients based on all the target pre-modified cooking parameters, which is not limited in the present embodiment of the application.

Optionally, aforementioned updating a cooking recipe corresponding to the target combination of ingredients according to all the targeted pre-modified cooking parameters may include: identifying the original recipe data in the cooking recipes corresponding to the target combination of ingredients according to all the target pre-modified cooking parameters; identifying the modifications corresponding to the original recipe data; and updating the cooking recipes corresponding to the target combination of ingredients according to the modifications, which is not limited in the present embodiment of the application.

In the present embodiment of the application, regarding other descriptions of step 201 to step 203, please refer to the other detailed descriptions in embodiment 1 regarding step 101 to step 103, which is not repeated in the present embodiment of the application.

It is evident that the present embodiment of the application may perform the optimizing analysis of the target combination of ingredients and the ingredient-related data, and generate the cooking recipe corresponding to the target combination of ingredients based on the identified pending optimization situation, which is beneficial to improve the comprehensiveness, flexibility and intelligence of the cooking recipe generation manner, which is beneficial to improve the reasonableness, dependability and optimizability of the generation of cooking recipes, which is beneficial to improve the accuracy and reliability of the generated cooking recipes, and which is also beneficial to improve the diversity and completeness of the generated cooking recipes. Additionally, an updating manner of the cooking recipe may be provided. The cooking optimization situation is analyzed according to the cooking feedback data, and the cooking recipe is only updated when the cooking optimization situation is used for indicating that the optimizing condition of the finished product performance is met, which is beneficial to improve the reasonableness and comprehensiveness of the updating manner of the cooking recipe, which is beneficial to improve the execution reasonableness and execution reliability of the updated cooking recipe, which is beneficial to improve the updating accuracy and updating reliability of the cooking recipe, which is also beneficial to improve the applicability and the reliability of the updated cooking recipe.

In an optional embodiment, before updating a cooking recipe corresponding to the target combination of ingredients according to all the targeted pre-modified cooking parameters, the method may also include steps as follows:

identifying one or more target pre-modified cooking parameters that meet a preset optimizing condition of the finished product performance;

predicting the closeness optimization degree between the updated finished product performance obtained from the updated cooking recipe based on all the target pre-modified cooking parameters and the expected finished product performance corresponding to the target combination of ingredients, according to all the target pre-modified cooking parameters and the preset analyzing manner of the cooking parameter performance;

identifying the comprehensive effectiveness of recipe updating based on all target pre-modified cooking parameters according to the closeness optimization degree and the modified operation information corresponding to all identified target pre-modified cooking parameters;

determining whether the comprehensive effectiveness is greater than or equal to a preset comprehensive effectiveness threshold;

when a corresponding determination result is positive, performing the operation of updating a cooking recipe corresponding to the target combination of ingredients according to all the targeted pre-modified cooking parameters; and when a corresponding determination result is negative, outputting a decision indicator to remind the user to confirm the cooking recipe update or simply ending the cooking recipe update operation.

It is evident that, in the present optional embodiment, the comprehensive validity of updated cooking recipes may be determined, and the step of updating the cooking recipe is only performed when the comprehensive validity is greater than or equal to the preset comprehensive validity threshold, which is beneficial to improve the comprehensiveness of the updating manner of the cooking recipe, which is beneficial to improve the updating validity and the updating reliability of the cooking recipe, which also reduces unnecessary updating of the cooking recipe causing waste of resources.

Embodiment 3

Figure 3:
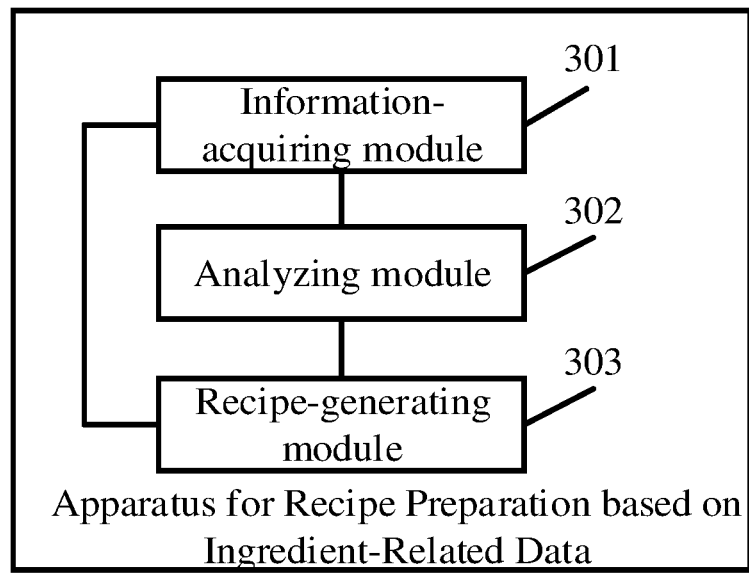
FIG. 3 is a structural diagram of an apparatus for recipe preparation based on ingredient-related data disclosed in an embodiment of the present application.

Referring to FIG. 3, FIG. 3 is a structural diagram of an apparatus for recipe preparation based on ingredient-related data disclosed in the present embodiment of the application. The apparatus described in FIG. 3 may include a server, wherein the server includes a local server or a cloud server, which is not limited in the present embodiment of the application. As shown in FIG. 3, the apparatus for recipe preparation based on ingredient-related data may include:

an information-acquiring module 301, used for acquiring ingredient-related data of a target combination of ingredients uploaded by a user, the ingredient-related data including one or more of an ingredient type, a cooking process, a cooking cuisine, a finished cooking product and a cooking performance.

an analyzing module 302, used for analyzing a pending optimization situation corresponding to the target combination of ingredients according to the ingredient-related data; and a recipe-generating module 303, used for generating a cooking recipe corresponding to the target combination of ingredients according to the pending optimization situation and the ingredient-related data.

It is evident that performing the apparatus for recipe preparation based on ingredient-related data described in FIG. 3 may perform the optimizing analysis of the target combination of ingredients and the ingredient-related data, and generate the cooking recipe corresponding to the target combination of ingredients based on the identified pending optimization situation, which is beneficial to improve the comprehensiveness, flexibility and intelligence of the cooking recipe generation manner, which is beneficial to improve the reasonableness, dependability and optimizability of the generation of cooking recipes, which is beneficial to improve the accuracy and reliability of the generated cooking recipes, and which is also beneficial to improve the diversity and completeness of the generated cooking recipes.

In an optional embodiment, the step of the analyzing module 302 analyzing a pending optimization situation corresponding to the target combination of ingredients according to the ingredient-related data specifically includes:

analyzing at least one targeted pending optimization type corresponding to the target combination of ingredients according to the ingredient-related data and a preset pending-optimization-type analyzing manner; and identifying the pending optimization situation corresponding to the target combination of ingredients according to all the targeted pending optimization type and the ingredient-related data.

Figure 4:
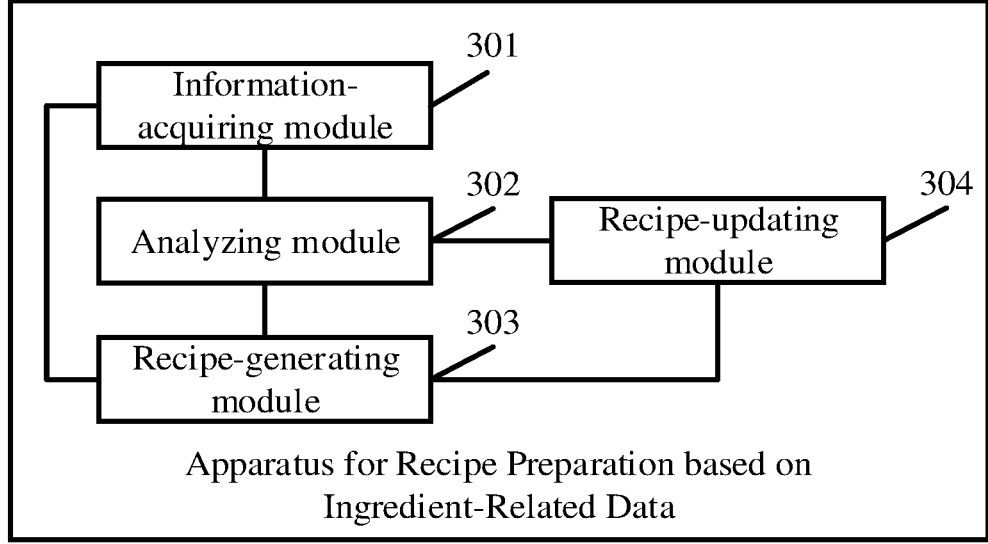
FIG. 4 is a structural diagram of another apparatus for recipe preparation based on ingredient-related data disclosed in an embodiment of the present application.

It is evident that, by performing the apparatus described in FIG. 4, different pending optimization types may be identified, and the pending optimization situation may be identified according to one or more identified pending optimization type, which is beneficial to improve the comprehensiveness and reasonableness of the identified manner of the pending optimization situation, which is beneficial to improve the diversity and comprehensiveness of the pending optimization type, which is also beneficial to improve the accuracy and reliability of the identified pending optimization situation.

In an optional embodiment, the step of the analyzing module 302 identifying the pending optimization situation corresponding to the target combination of ingredients according to all the targeted pending optimization types and the ingredient-related data specifically includes:

identifying a pending optimization orientation corresponding to each targeted pending optimization type according to a preset optimization-orientation analyzing manner, and determining whether there exist at least two pending-optimization conflicting types meeting an optimization conflicting condition in all targeted pending optimization types according to all pending optimization orientations;

when a corresponding determination result is positive, selecting the pending-optimization conflicting type from all targeted pending optimization types, and identifying an expected finished product performance corresponding to the target combination of ingredients; analyzing an optimization type adjusting situation according to the expected finished product performance and all pending-optimization conflicting types; the optimization type adjusting situation is used for adjusting the targeted pending optimization type, so that all targeted pending optimization types do not satisfy the optimization conflicting condition;

identifying at least one final pending optimization type according to the optimization type adjusting situation and all targeted pending optimization types; identifying the pending optimization situation corresponding to the target combination of ingredients according to all final pending optimization types and the ingredient-related data; and when a corresponding determination result is negative, identifying the pending optimization situation of the target combination of ingredients according to all targeted pending optimization types and the ingredient-related data.

It is evident that, by performing the apparatus described in FIG. 4, the pending optimization conflicting situation may be identified according to the pending optimization orientation corresponding to each pending optimization type, and an identified manner corresponding to the pending optimization situation may be identified according to the pending optimization conflicting situation, which is beneficial to improve the comprehensiveness and reasonableness of the identified manner of the pending optimization situation, which is beneficial to improve the flexibility and relevance of the identified manner of the pending optimization situation, which is also beneficial to improve the accuracy and reliability of the identified pending optimization situation.

In an optional embodiment, the step of the analyzing module 302 analyzing at least one targeted pending optimization type corresponding to the target combination of ingredients according to the ingredient-related data and a preset pending-optimization-type analyzing manner specifically includes:

identifying the expected finished product performance corresponding to the target combination of ingredients, and identifying a predicted finished product performance corresponding to the ingredient-related data according to the ingredient-related data and a preset finished-product-effect analyzing manner;

determining whether the expected finished product performance matches the predicted finished product performance; and when a corresponding determination result is negative, identifying difference information corresponding to the expected finished product performance and the predicted finished product performance, and identifying at least one targeted pending optimization type corresponding to the target combination of ingredients according to the difference information and the ingredient-related data.

It is evident that, by performing the apparatus described in FIG. 4, the difference information between the expected finished product performance and the predicted finished product performance may be identified, and the targeted pending optimization type may be identified based on the difference information, which is beneficial to improve the comprehensiveness and reasonableness of the identified manner of the pending optimization type, which is beneficial to the accuracy and reliability of the identified pending optimization type. Additionally, when the expected finished product performance and the predicted finished product performance mismatch, performing the identification of the targeted pending optimization type based on the difference information, which is beneficial to improve the relevance and matching of the identified manner of the pending optimization type, which is beneficial to improve the identified efficiency and accuracy of the pending optimization type.

In an optional embodiment, the analyzing module 302 is also used for, before identifying at least one targeted pending optimization type corresponding to the target combination of ingredients according to the difference information and the ingredient-related data, analyzing, according to the difference information, execution possibility to achieve the expected finished product performance based on the target combination of ingredients; determining whether the execution possibility is greater than or equal to a preset execution possibility threshold; and when a corresponding determination result is positive, performing the aforementioned operation of identifying at least one targeted pending optimization type corresponding to the target combination of ingredients according to the difference information and the ingredient-related data.

It is evident that, by performing the apparatus described in FIG. 4, the step of identifying the targeted pending optimization type based on the difference information is only performed when the execution possibility is greater than or equal to the execution possibility threshold, which is beneficial to improve the comprehensiveness and reasonableness of the identified manner of the pending optimization type, which is beneficial to improve the reasonableness and feasibility of the identified pending optimization type, which also reduces unnecessary waste of resources.

In an optional embodiment, the step of the analyzing module 302 identifying at least one targeted pending optimization type corresponding to the target combination of ingredients according to the difference information and the ingredient-related data specifically includes:

computing a similarity degree between a matching finished product performance corresponding to each historical cooking recipe and the expected finished product performance according to the expected finished product performance corresponding to the target combination of ingredients, and selecting at least one targeted historical cooking recipe with the similarity degree that meets similarity filter conditions in all historical cooking recipes;

analyzing special-handling-operation information to achieve the expected finished product performance based on the target combination of ingredients, according to matching ingredient-related data corresponding to selected targeted historical cooking recipes, the ingredient-related data and the difference information; and identifying at least one targeted pending optimization type corresponding to the target combination of ingredients according to the special-handling-operation information.

It is evident that, by performing the apparatus described in FIG. 4, the special-handling-operation information may be analyzed in conjunction with the historical cooking recipes, and the targeted pending optimization type may be identified according to the special-handling-operation information, which is beneficial to improve the comprehensiveness and comparability of the identified manner of the pending optimization type, which is beneficial to improve the reasonableness of the identified manner of the pending optimization type, which is also beneficial to improve the accuracy and reliability of the identified pending optimization type.

In an optional embodiment, an information-acquiring module 301 is also used for, after a recipe-generating module 303 generates a cooking recipe corresponding to the target combination of ingredients according to the pending optimization situation and the ingredient-related data, collecting cooking feedback data from users on cooking recipes.

the analyzing module 302 is also used for identifying at least one pre-modified cooking parameter corresponding to the cooking recipe according to the cooking feedback data; and analyzing all pre-modified cooking parameters and a cooking optimization situation of expected finished product performance corresponding to the target combination of ingredients according to a preset cooking performance analyzing manner; and As shown in FIG. 4, the apparatus may also include:

a recipe-updating module 304, used for, when the cooking optimization situation is used for indicating that there exist one or more targeted pre-modified cooking parameters that meet a finished-product performance-optimization condition, updating a cooking recipe corresponding to the target combination of ingredients according to all the targeted pre-modified cooking parameters.

It is evident that, by performing the apparatus described in FIG. 4, an updating manner of the cooking recipe may be provided. The cooking optimization situation is analyzed according to the cooking feedback data, and the cooking recipe is only updated when the cooking optimization situation is used for indicating that the optimizing condition of the finished product performance is met, which is beneficial to improve the reasonableness and comprehensiveness of the updating manner of the cooking recipe, which is beneficial to improve the execution reasonableness and execution reliability of the updated cooking recipe, which is beneficial to improve the updating accuracy and updating reliability of the cooking recipe, which is also beneficial to improve the applicability and the reliability of the updated cooking recipe.

Embodiment 4

Figure 5:
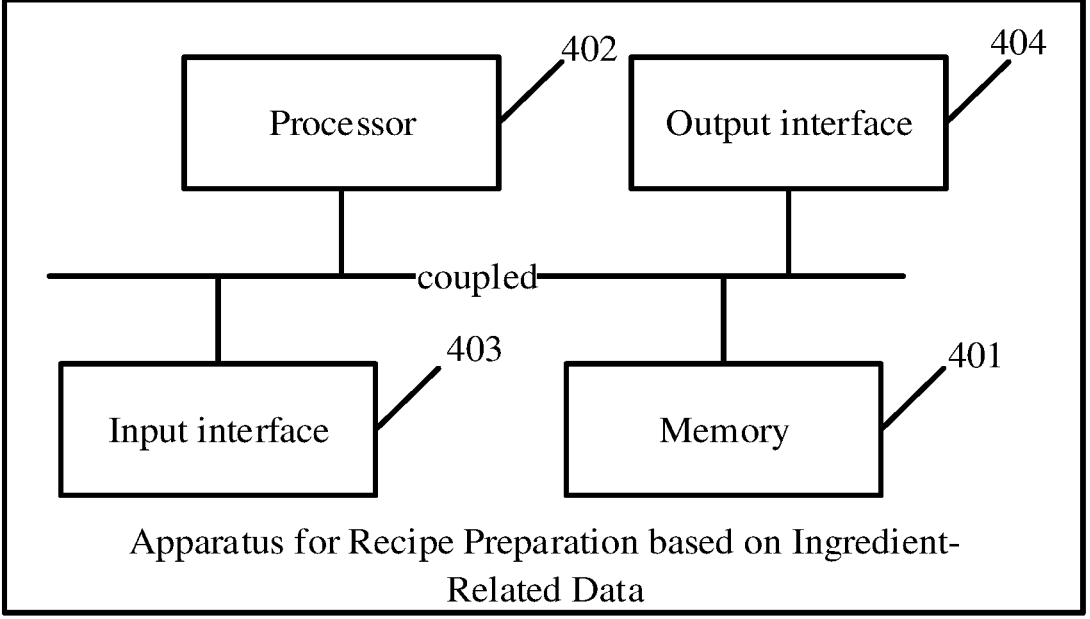
FIG. 5 is a structural diagram of a further apparatus for recipe preparation based on ingredient-related data disclosed in an embodiment of the present application.

Referring to FIG. 5, FIG. 5 is a structural diagram of a further apparatus for recipe preparation based on ingredient-related data disclosed in the present embodiment of the application. The apparatus described in FIG. 5 may include a server, wherein the server includes a local server or a cloud server, which is not limited in the present embodiment of the application. As shown in FIG. 5, the apparatus may include:

a memory 401, memorized with an executable code;

a processor 402, coupled with the memory 401; and an input interface 403 and an output interface 404 respectively coupled with the processor 402, wherein the processor 402 invokes the executable code memorized in the memory 401 to perform steps of the method for recipe preparation based on ingredient-related data as described in embodiment 1 or embodiment 2.

Embodiment 5

Disclosed in the present embodiment of the application is a computer memory medium, which memorizes with a computer program for electronic data interchange, wherein the computer program enables the computer to perform steps of the method for recipe preparation based on ingredient-related data described in embodiment 1 or embodiment 2.

Embodiment 6

Disclosed in the present embodiment of the application is a computer program product, the computer program product including a non-instantaneous computer-readable memory medium memorized with a computer program. The computer program may be operated to enable the computer to perform steps in the method for recipe preparation based on ingredient-related data described in embodiment 1 or embodiment 2.

The aforementioned embodiment of the apparatus is only illustrative. The modules described as separate components may or may not be physically separated, and the modules used as components for display may or may not be physical modules, that is, they may be located in the same place or may be distributed to a plurality of network modules. Some or all these modules may be selected according to practical demands to achieve the purpose of the solution of the present embodiment. It may be understood and performed by a person of ordinary skill in the art without inventive effort.

With the specific description of the above embodiments, it is clear to those skilled in the art that the various implementations may be implemented with the aid of software plus the necessary common hardware platform, and of course, with the aid of hardware. Based on this understanding, the above technical solutions that essentially or contribute to the prior art may be embodied in the form of a software product which may be memorized in a computer-readable memory medium, the memory medium including Read-Only Memory, Random Access Memory, Programmable Read-only Memory, Erasable Programmable Read Only Memory, One-time Programmable Read-Only Memory, Electrically-Erasable Programmable Read-Only Memory, Compact Disc Read-Only Memory, other Compact Disc Memory, Disk Memory, Tape Memory or any other computer-readable medium that may be used to carry or memorize data.

Finally, it should be noted that the method and apparatus for recipe preparation based on ingredient-related data disclosed in the embodiments of the present application are only preferred embodiments of the present application, and are only used to illustrate the technical solutions of the present application, but not to limit them. Despite the detailed description of the application with reference to the aforementioned embodiments, it should be understood, by those skilled in the art, that the technical solutions recorded in the aforementioned embodiments may still be modified, or equivalent substitutions for some of the technical features thereof may be made; which the essence of the corresponding technical solutions of these modifications or substitutions is without departing from the spirit and scope of the technical solutions of the various embodiments of the application.

The invention claimed is:

1. A method for recipe preparation based on ingredient-related data, wherein the method is applied to a server using an apparatus for recipe preparation based on ingredient-related data, the method comprises:

acquiring, by an information-acquiring module of the apparatus for recipe preparation based on ingredient-related data, ingredient-related data of a target combination of ingredients uploaded by a user, the ingredient-related data comprising one or more of an ingredient type, a cooking process, a cooking cuisine, a finished cooking product and a cooking performance;

analyzing, by an analyzing module of the apparatus for recipe preparation based on ingredient-related data, at least one target pending optimization type corresponding to the target combination of ingredients according to the ingredient-related data and a preset pending-optimization-type analyzing manner; the pending-optimization-type analyzing manner comprises one or more of a cooking color-aroma-taste optimization-type analyzing manner, a cooking process optimization-type analyzing manner, a cooking requirement optimization-type analyzing manner, a cooking time optimization-type analyzing manner, a cooking seasoning optimization-type analyzing manner, a cooking heat optimization-type analyzing manner and any other optimization-type analyzing manners used for generating information of cooking recipe; the target pending optimization type comprises one or more of a color-aroma-taste optimization type, a cooking process optimization type, a cooking requirement optimization type, a cooking time optimization type, a cooking seasoning optimization type, a cooking heat optimization type and any other optimization types with cooking related information;

identifying, by the analyzing module of the apparatus for recipe preparation based on ingredient-related data, a pending optimization orientation corresponding to each target pending optimization type according to a preset optimization-orientation analyzing manner, and determining, by the analyzing module of the apparatus for recipe preparation based on ingredient-related data, whether there exist at least two pending-optimization conflicting types meeting an optimization conflicting condition in all target pending optimization types according to all pending optimization orientations;

when a corresponding determination result is positive, selecting, by the analyzing module of the apparatus for recipe preparation based on ingredient-related data, the pending-optimization conflicting type from all target pending optimization types, and identifying an expected finished product performance corresponding to the target combination of ingredients; analyzing an optimization type adjusting situation according to the expected finished product performance and all pending-optimization conflicting types; the optimization type adjusting situation is used for adjusting the target pending optimization type, so that all target pending optimization types do not satisfy the optimization conflicting condition; identifying at least one final pending optimization type according to the optimization type adjusting situation and all target pending optimization types; identifying the pending optimization situation corresponding to the target combination of ingredients according to all final pending optimization types and the ingredient-related data;

when a corresponding determination result is negative, identifying, by the analyzing module of the apparatus for recipe preparation based on ingredient-related data, the pending optimization situation of the target combination of ingredients according to all target pending optimization types and the ingredient-related data; and generating, by a recipe-generating module of the apparatus for recipe preparation based on ingredient-related data, a cooking recipe corresponding to the target combination of ingredients according to the pending optimization situation and the ingredient-related data, the pending optimization situation comprising one of a cooking improving adjusting situation, an incorrect cooking situation, and an achievable cooking situation.

2. The method for recipe preparation based on ingredient-related data according to claim 1, characterized in that analyzing at least one target pending optimization type corresponding to the target combination of ingredients according to the ingredient-related data and a preset pending-optimization-type analyzing manner comprises:

identifying the expected finished product performance corresponding to the target combination of ingredients, and identifying a predicted finished product performance corresponding to the ingredient-related data according to the ingredient-related data and a preset finished-product-effect analyzing manner;

determining whether the expected finished product performance matches the predicted finished product performance; and when a corresponding determination result is negative, identifying difference information corresponding to the expected finished product performance and the predicted finished product performance, and identifying at least one target pending optimization type corresponding to the target combination of ingredients according to the difference information and the ingredient-related data.

3. An apparatus for recipe preparation based on ingredient-related data, wherein the apparatus comprises:

a memory, memorized with an executable code; and a processor, coupled with the memory, wherein the processor invokes the executable code memorized in the memory to perform the method for recipe preparation based on ingredient-related data according to claim 2.

4. A non-transitory computer memory medium, wherein the computer memory medium memorizes computer instructions; when the computer instructions are invoked, the method for recipe preparation based on ingredient-related data as claimed in claim 2 is performed.

5. The method for recipe preparation based on ingredient-related data according to claim 2, characterized in that before identifying at least one target pending optimization type corresponding to the target combination of ingredients according to the difference information and the ingredient-related data, the method also comprises:

analyzing, according to the difference information, an execution possibility to achieve the expected finished product performance based on the target combination of ingredients;

determining whether the execution possibility is greater than or equal to a preset execution possibility threshold; and when a corresponding determination result is positive, performing an operation of identifying at least one target pending optimization type corresponding to the target combination of ingredients according to the difference information and the ingredient-related data.

6. An apparatus for recipe preparation based on ingredient-related data, wherein the apparatus comprises:

a memory, memorized with an executable code; and a processor, coupled with the memory, wherein the processor invokes the executable code memorized in the memory to perform the method for recipe preparation based on ingredient-related data according to claim 5.

7. A non-transitory computer memory medium, wherein the computer memory medium memorizes computer instructions; when the computer instructions are invoked, the method for recipe preparation based on ingredient-related data as claimed in claim 5 is performed.

8. The method for recipe preparation based on ingredient-related data according to claim 5, characterized in that identifying at least one target pending optimization type corresponding to the target combination of ingredients according to the difference information and the ingredient-related data comprises:

computing a similarity degree between a matching finished product performance corresponding to each historical cooking recipe and the expected finished product performance according to the expected finished product performance corresponding to the target combination of ingredients, and selecting at least one target historical cooking recipe with the similarity degree that meets similarity filter conditions in all historical cooking recipes;

analyzing special-handling-operation information to achieve the expected finished product performance based on the target combination of ingredients, according to matching ingredient-related data corresponding to selected target historical cooking recipes, the ingredient-related data and the difference information; and identifying at least one target pending optimization type corresponding to the target combination of ingredients according to the special-handling-operation information.

9. An apparatus for recipe preparation based on ingredient-related data, wherein the apparatus comprises:

a memory, memorized with an executable code; and a processor, coupled with the memory, wherein the processor invokes the executable code memorized in the memory to perform the method for recipe preparation based on ingredient-related data according to claim 8.

10. A non-transitory computer memory medium, wherein the computer memory medium memorizes computer instructions; when the computer instructions are invoked, the method for recipe preparation based on ingredient-related data as claimed in claim 8 is performed.

11. The method for recipe preparation based on ingredient-related data according to claim 8, characterized in that after generating a cooking recipe corresponding to the target combination of ingredients according to the pending optimization situation and the ingredient-related data, the method also comprises:

collecting cooking feedback data from users on cooking recipes, and identifying at least one pre-modified cooking parameter corresponding to the cooking recipes according to the cooking feedback data;

analyzing all pre-modified cooking parameters and a cooking optimization situation of expected finished product performance corresponding to the target combination of ingredients according to a preset cooking performance analyzing manner; and when the cooking optimization situation is used for indicating that there exist one or more target pre-modified cooking parameters satisfying a finished-product performance-optimization condition, updating a cooking recipe corresponding to the target combination of ingredients according to all the target pre-modified cooking parameters.

12. An apparatus for recipe preparation based on ingredient-related data, wherein the apparatus comprises:

a memory, memorized with an executable code; and a processor, coupled with the memory, wherein the processor invokes the executable code memorized in the memory to perform the method for recipe preparation based on ingredient-related data according to claim 11.

13. A non-transitory computer memory medium, wherein the computer memory medium memorizes computer instructions; when the computer instructions are invoked, the method for recipe preparation based on ingredient-related data as claimed in claim 11 is performed.

14. An apparatus for recipe preparation based on ingredient-related data, wherein the apparatus comprises:

a memory, memorized with an executable code; and a processor, coupled with the memory, wherein the processor invokes the executable code memorized in the memory to perform the method for recipe preparation based on ingredient-related data according to claim 1.

15. A non-transitory computer memory medium, wherein the computer memory medium memorizes computer instructions; when the computer instructions are invoked, the method for recipe preparation based on ingredient-related data as claimed in claim 1 is performed.

16. An apparatus for recipe preparation based on ingredient-related data, wherein the apparatus comprises a processor, the processor configured as:

an information-acquiring module, to acquire ingredient-related data of a target combination of ingredients uploaded by a user, the ingredient-related data comprising one or more of an ingredient type, a cooking process, a cooking cuisine, a finished cooking product and a cooking performance;

an analyzing module, to analyze at least one target pending optimization type corresponding to the target combination of ingredients according to the ingredient-related data and a preset pending-optimization-type analyzing manner, wherein the pending-optimization-type analyzing manner comprises one or more of a cooking color-aroma-taste optimization-type analyzing manner, a cooking process optimization-type analyzing manner, a cooking requirement optimization-type analyzing manner, a cooking time optimization-type analyzing manner, a cooking seasoning optimization-type analyzing manner, a cooking heat optimization-type analyzing manner and any other optimization-type analyzing manners used for generating information of cooking recipe, the target pending optimization type comprises one or more of a color-aroma-taste optimization type, a cooking process optimization type, a cooking requirement optimization type, a cooking time optimization type, a cooking seasoning optimization type, a cooking heat optimization type and any other optimization types with cooking related information;

to identify a pending optimization orientation corresponding to each target pending optimization type according to a preset optimization-orientation analyzing manner, and to determine whether there exist at least two pending-optimization conflicting types meeting an optimization conflicting condition in all target pending optimization types according to all pending optimization orientations;

when a corresponding determination result is positive, to select the pending-optimization conflicting type from all target pending optimization types, and identifying an expected finished product performance corresponding to the target combination of ingredients; analyzing an optimization type adjusting situation according to the expected finished product performance and all pending-optimization conflicting types; the optimization type adjusting situation is used for adjusting the target pending optimization type, so that all target pending optimization types do not satisfy the optimization conflicting condition; to identify at least one final pending optimization type according to the optimization type adjusting situation and all target pending optimization types; identifying the pending optimization situation corresponding to the target combination of ingredients according to all final pending optimization types and the ingredient-related data;

when a corresponding determination result is negative, to identify the pending optimization situation of the target combination of ingredients according to all target pending optimization types and the ingredient-related data; and a recipe-generating module to generate a cooking recipe corresponding to the target combination of ingredients according to the pending optimization situation and the ingredient-related data, the pending optimization situation comprising one of a cooking improving adjusting situation, an incorrect cooking situation, and an achievable cooking situation.

* * * * *